Nov. 6, 1934.  W. DE F. CROWELL  1,980,039
VENTILATING APPARATUS FOR VEHICLE BODIES
Filed July 22, 1933

INVENTOR.
WILLIAM deF. CROWELL.
BY Bakewell & Church
ATTORNEYS.

Patented Nov. 6, 1934

1,980,039

UNITED STATES PATENT OFFICE 1,980,039

VENTILATING APPARATUS FOR VEHICLE BODIES

William de F. Crowell, St. Louis, Mo.

Application July 22, 1933, Serial No. 681,709

6 Claims. (Cl. 296—94)

This invention relates to ventilating apparatus for vehicle bodies, and particularly, ventilating apparatus of the type or kind that comprise a suction slot or exhaust opening, produced usually by a partly open side wall window, or by a suction slot or exhaust opening disposed in a portion of the vehicle body at such a point that the air which rushes across said window opening or ventilating slot when the vehicle is traveling forwardly, will create a suction on same of sufficient intensity to draw air, gases, smoke and the like from the interior of the body, in conventional vehicle body ventilating apparatus of the general type or kind above mentioned the air which filters into the body through floor cracks and other openings in the lower portion of the body, is the sole source of supply of fresh air at times when the vehicle is being ventilated by a partly open window or by a suction device of the kind mentioned.

One object of my invention is to enhance or improve the ventilation of vehicle bodies, and to this end I have devised a vehicle body that is equipped with a novel means that causes an adequate quantity of fresh air to be supplied or introduced into the body during the operation of drawing air, gases and the like from the interior of the body by a suction produced by external air currents.

Another object of my invention is to avoid discomfiture to the occupants of a vehicle body that is being ventilated, and to this end I have devised a vehicle body that is equipped with a novel fresh air intake or inlet disposed so as to reduce or eliminate a draught below the level of the seats of the vehicle.

And still another object of my invention is to provide an automobile body or similar vehicle body, that is equipped with a fresh air supply means disposed in such a way that the fresh air admitted to the body will not strike the occupants, and moreover, tends to prevent the accumulation or cause the removal of frost or steam on the inside face of the wind shield of the vehicle. Other objects and desirable features of my invention will be hereinafter pointed out.

Figure 1 of the drawing is a transverse sectional view of an automobile body looking forwardly towards the inside face of the wind shield, said view being taken on the line 1—1 of Figure 2.

In the accompanying drawing I have illustrated my improved fresh air supply means as forming part of a vehicle body that is provided with side wall doors equipped with movable or adjustable windows that are adapted to be set so as to produce substantially upright or vertically-disposed ventilating slots adjacent the wind shield through which air, gases and the like are exhausted from the interior of the body by the air which rushes rearwardly over the side walls of the body when the vehicle is traveling forwardly. I wish it to be understood, however, that it is immaterial whether the vehicle body is equipped with a special suction means for inducing a circulation through the body, or is merely equipped with a conventional side wall window that can be partly lowered or otherwise adjusted so as to produce an exhaust opening. Moreover, while said fresh air supply means is preferably used in combination with a suction opening or exhaust opening, as previously described, it is not limited to such use.

Figure 4:
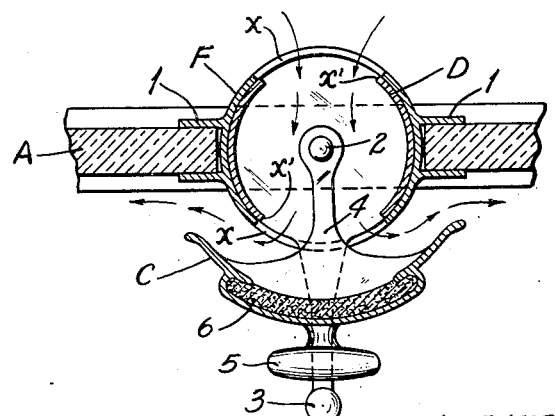
Figure 4 is a horizontal sectional view, taken on the line 4—4 of Figure 1.

In the preferred form of my invention herein illustrated the wind shield A of the vehicle is of the fixed or stationary type and is provided at approximately its center with a vertically-disposed air inlet designated by the reference character $x$ in Figure 4, and the side wall doors B of the body are equipped with upright or substantially vertically-disposed suction slots or ventilating openings $y$ through which air, gases, smoke and the like on the interior of the body are effectively withdrawn by the external air currents which rush rearwardly across the outer ends of said suction slots $y$ when the vehicle is traveling forwardly. The air admitted to the interior of the body through the fresh air supply $x$ insures an efficient circulation of air through the body, and it reduces or relieves the suction on floor cracks and other openings in the lower portion of the body through which dirt or unclean gases are liable to be drawn into the vehicle body when the suction slots $y$ are in use. While the particular location of the fresh air admission opening $x$ may be varied, I prefer to locate it at or adjacent the longitudinal center of the body, at a point above the level of the seats of the body so as to prevent the occupants from being subjected to objectionable draughts. I also prefer to combine with said fresh air supply means $x$ an air baffling or deflecting means disposed so as to cause the incoming fresh air to flow in contact or approximate contact with the inside face of the wind shield A, whereby the tendency of frost or steam to collect on the wind shield is reduced or eliminated. In the form of my invention herein illustrated the air deflecting or baffling means just referred to is designated as an entirety by the reference character C, and is preferably constructed in such a way that it can be adjusted by the operator in charge of the vehicle so as to cause the entire supply of fresh air to be directed or diverted laterally towards either one of the suction slots y in the side wall of the vehicle, or to divide, after entering the vehicle, and flow laterally in opposite directions towards said suction slots. Another feature that may be incorporated in my improved ventilating apparatus, if desired, is a means for enabling an occupant of the vehicle to cut off or regulate the quantity of air supplied by the air inlet x, the means last referred to being herein illustrated as consisting of a valve D that can be adjusted so as to vary or completely cut off the admission of air to the vehicle body through the air inlet opening x.

In the accompanying drawing, which, as previously stated, represents only one of many forms of my invention, the suction slots or openings y in the side walls are produced by narrow upright gaps between the front upright window frame members of the doors B and the front edges of adjustable windows E mounted in said doors. The air inlet or air admission opening x is formed by a vertically-disposed slot in a substantially tubular member F, set at the center of the wind shield and provided with channel-shaped portions 1 that receive the wind shield glass, said tubular member F preferably extending the entire height of the wind shield, so as to make it practicable to form the wind shield from two pieces of glass of approximately one-half the width of the conventional wind shield glass. In the rear side of the member F is a slot or opening x in alignment with the inlet opening in the front side of the member F. The means D used to cut off or vary the admission of air to the interior of the vehicle through the supply opening x consists of a substantially tubular part that is oscillatingly mounted inside of the tubular member F by vertically-disposed pivots 2 positioned in end walls in the stationary tubular supporting member F and in the oscillating tubular member D, said oscillating tubular member being provided with diametrically-opposed slots x' arranged so as to line up with the slots x in the member F when the member D is adjusted in its center position, as shown in Figure 4, and to be out of registration with said slots x, thus causing an imperforate portion of the member D to act as a cut off valve or regulating valve for the air supply means x when the member D is oscillated by manipulating a finger piece or handle 3 attached to one end of same.

Figure 1:
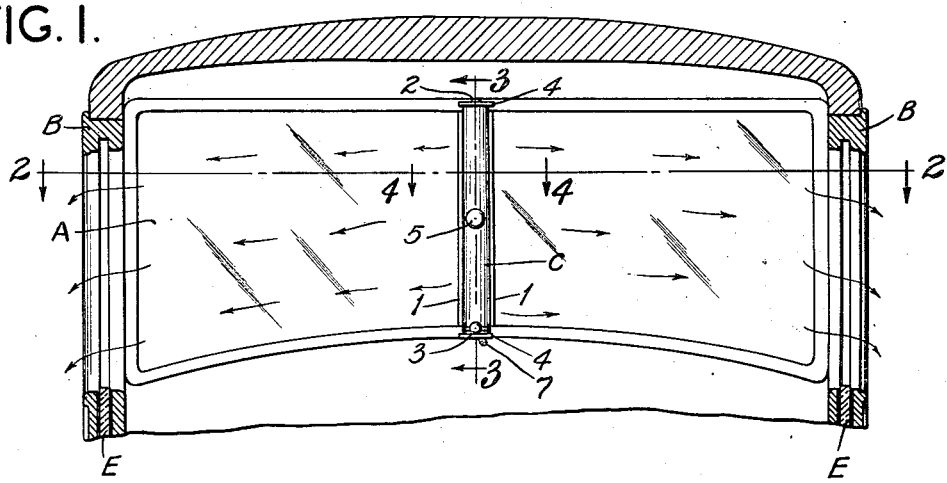
Figure 2:
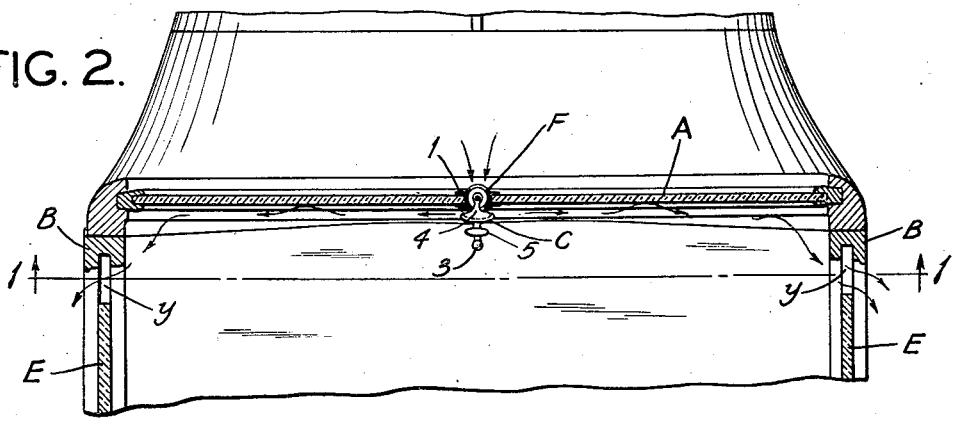
Figure 2 is a horizontal sectional view, taken on the line 2—2 of Figure 1.
Figure 3:
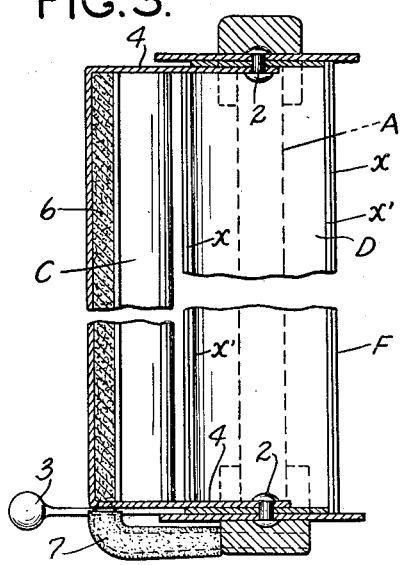
Figure 3 is a vertical sectional view, taken on the line 3—3 of Figure 1.

The air deflecting or baffling means C is herein illustrated as consisting of a shiftable metal part of any suitable or preferred cross-sectional shape, provided at its upper and lower ends with forwardly-projecting arms 4 pivotally mounted on the pivots 2 in such a way that the member C can be arranged in a central position, as shown in Figure 4, so as to cause the incoming fresh air to divide and flow laterally in opposite directions towards the suction slots y, or arranged in a position to the right or to the left of its central position so as to divert all of the incoming air towards one or the other of the suction openings y. If the member C is shifted laterally towards the left, looking at Figure 4, all of the incoming fresh air will be diverted towards the suction opening y in the right hand side of the vehicle body, and if said member C is shifted laterally to the right, all of the incoming fresh air will be diverted laterally towards the suction opening y in the left hand wall of the body. To facilitate the shifting or adjustment of the air deflecting or baffling member C, said member is provided with a finger piece or handle 5 arranged within easy reach of the operator or some other occupant of the vehicle. The member C is preferably constructed so that if water or rain is incorporated in the inflowing air that enters the body through the fresh air inlet x, said water or rain will be filtered or separated from the air and prevented from spattering into the body, and in the form of my invention herein illustrated the air deflecting or baffling member C is made of curved shape or substantially trough or channel shape in cross section, and has incorporated in same screening material or other suitable cellular, porous or perforated material 6 which will tend to cause rain or water that is entrained with the incoming air to be separated or removed from same, the member C being provided at its lower end with a drain 7 leading to any suitable discharge point, through which the separated rain or water escapes. As previously stated, the cross-sectional shape or form of the member C may be varied, but I prefer to construct the member C so that it causes the inflowing fresh air to be directed or deflected towards the inside face of the wind shield A, as well as laterally towards the suction opening or openings y, with the result that the inflowing fresh air admitted to the vehicle body will also tend to prevent or eliminate the accumulation of steam, frost or vapor on the inside face of the wind shield A, the arrows in Figure 2 indicating the general path of travel of the inflowing fresh air when the air deflecting or baffling member C is set in its central position.

I realize that in conventional automobile bodies fresh air may be admitted to the interior of same by adjusting the wind shield so as to provide an air inlet in same, or by opening ventilators in the cowl portion of the vehicle body. My improved ventilating apparatus is distinguished from prior structures, in that it is designed for use with a vehicle body having a fixed or stationary wind shield, and comprises or is equipped with a fresh air admission means which not only causes fresh air to be supplied to the interior of the body at a point above the seat level, but also causes said fresh air to flow in a path in contact or approximate contact with the inside face of the wind shield and to be directed laterally towards an exit without liability of striking the occupants of the body. When said exit consists of an exhaust opening or a suction opening in a side wall of the vehicle, said suction opening, as previously stated, may consist of a partly lowered window or a special suction slot or opening designed so as to induce a circulation on the interior of the vehicle body. The details of construction of the fresh air admission and deflecting or diverting means may be varied to suit existing conditions.

Having thus described my invention, what I claim as new and desire to secure by Letters Patent is:

1. In a vehicle body, the combination of a wind-shield, an upright or substantially vertically-disposed fresh air admission opening in the wind shield located intermediate the ends of same, an adjustable closure for said admission opening, and an adjustable air deflecting or baffling means combined with said fresh air admission opening, for causing the incoming air to flow laterally across the inner side of the wind shield without striking the occupants of the vehicle.

2. In a vehicle body, the combination of a wind shield, a substantially vertically-disposed tubular member in an intermediate portion of the wind shield provided with a fresh air admission opening, an adjustable part in said tubular member for varying or cutting off the inflow of the fresh air, and an air baffling or directing member at the rear side of the wind shield, disposed so as to cause the incoming fresh air to be diverted forwardly towards the inside face of the wind shield and also laterally over the inside face of the wind shield.

3. A vehicle body provided with a wind shield, an air exit in a side wall portion of the body, a substantially vertically-disposed tubular member mounted in the wind shield adjacent the center of same and provided with a fresh air admission opening, a regulating and cut off valve for said air admission opening oscillatingly mounted in said tubular member, an adjustable air deflecting and baffling member arranged at the rear of the wind shield in the path of the inflowing fresh air and disposed so as to divert the incoming air laterally across the wind shield and a means on said baffling member which tends to remove or separate water that may be entrained in the incoming fresh air.

4. In a vehicle body, the combination of a wind shield, an exhaust opening in a side wall of the body, a substantially upright or vertically-disposed fresh air admission opening in the wind shield located adjacent the longitudinal center of the body at a point above or approximately above the level of the seats of the vehicle, an air baffling or deflecting means combined with said air admission opening for directing or diverting the incoming fresh air towards the inside face of the wind shield and also laterally towards said exhaust opening, and means for cutting off or regulating the supply of fresh air to the interior of the body.

5. In a vehicle body, the combination of a wind shield, an upright exit or exhaust opening in the side wall portion of the body, and mechanism built into the wind shield for causing fresh air to flow into the body at a point some distance laterally from said exhaust opening and at a point approximately above the level of the seats of the vehicle, whereby the suction exerted on said exhaust opening by external air currents will cause said fresh air to flow laterally through the body at a point in front of the occupants of the body, thus effectively ventilating the vehicle without causing discomfiture to the occupants, said mechanism being equipped with an adjustable air regulator and also means for removing rain or water that may be entrained with the incoming fresh air.

6. In a vehicle body, the combination of a wind shield, an upright exit or exhaust opening in the side wall portion of the body, and mechanism built into the wind shield for causing fresh air to flow into the body at a point some distance laterally from said exhaust opening and at a point approximately above the level of the seats of the vehicle, whereby the suction exerted on said exhaust opening by external air currents will cause said fresh air to flow laterally through the body at a point in front of the occupants of the body, thus effectively ventilating the vehicle without causing discomfiture to the occupants, said mechanism comprising an adjustable closure for the air admission opening in same and also being equipped with an adjustable air deflecting or baffling means.

WILLIAM DE F. CROWELL.